United States Patent [19]

Ogata et al.

[11] Patent Number: 4,494,161

[45] Date of Patent: Jan. 15, 1985

[54] TAPE CASSETTE

[75] Inventors: Haruki Ogata, Sagamihara; Kimio Ogawa; Hiroyuki Umeda, both of Yokohama, all of Japan

[73] Assignee: Victor Company of Japan, Ltd., Yokohama, Japan

[21] Appl. No.: 339,675

[22] Filed: Jan. 15, 1982

[30] Foreign Application Priority Data

Jan. 20, 1981 [JP] Japan .................... 56-7566

[51] Int. Cl.³ ................. G11B 23/08; G11B 15/66
[52] U.S. Cl. ......................... 360/132; 360/94; 360/85
[58] Field of Search ............... 360/132, 94, 85; 242/199

[56] References Cited

U.S. PATENT DOCUMENTS 3,923,196 12/1975 Miller et al. .................. 220/335
4,173,319 11/1979 Umeda ........................ 360/132
4,358,070 11/1982 Okamura et al. ............... 242/199

FOREIGN PATENT DOCUMENTS

| 31927 | 12/1980 | European Pat. Off. . |
| 2404967 | 8/1974 | Fed. Rep. of Germany . |
| 2910783 | 9/1979 | Fed. Rep. of Germany . |
| 2935206 | 3/1980 | Fed. Rep. of Germany . |
| 2918003 | 12/1980 | Fed. Rep. of Germany . |
| 1095620 | 12/1967 | United Kingdom . |
| 1193854 | 6/1970 | United Kingdom . |
| 1334474 | 10/1973 | United Kingdom . |
| 1507150 | 4/1978 | United Kingdom . |
| 2020630A | 11/1979 | United Kingdom . |
| 1573412 | 8/1980 | United Kingdom . |

Primary Examiner—Robert S. Tupper
Attorney, Agent, or Firm—Louis Bernat

[57] ABSTRACT

A tape cassette comprises a cassette case, a tape accommodated within the cassette case where the tape has a front tape path part along the front surface of the cassette case when the tape cassette is not used, a lid rotatably provided at the front surface of the cassette case free to open and close where the lid covers the tape at the front tape path part when the lid is closed, and a mechanism for maintaining the lid in an open state and a closed state, respectively.

5 Claims, 23 Drawing Figures

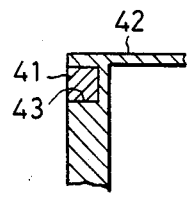
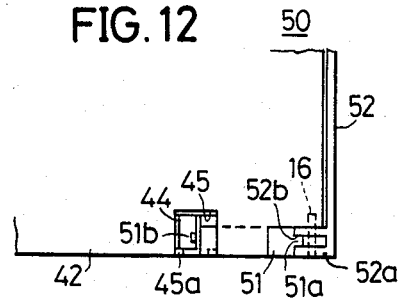
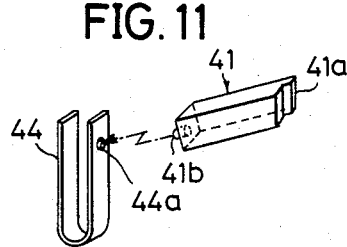
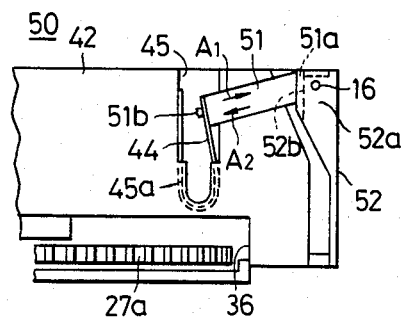
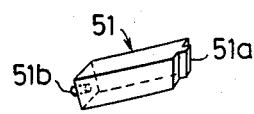
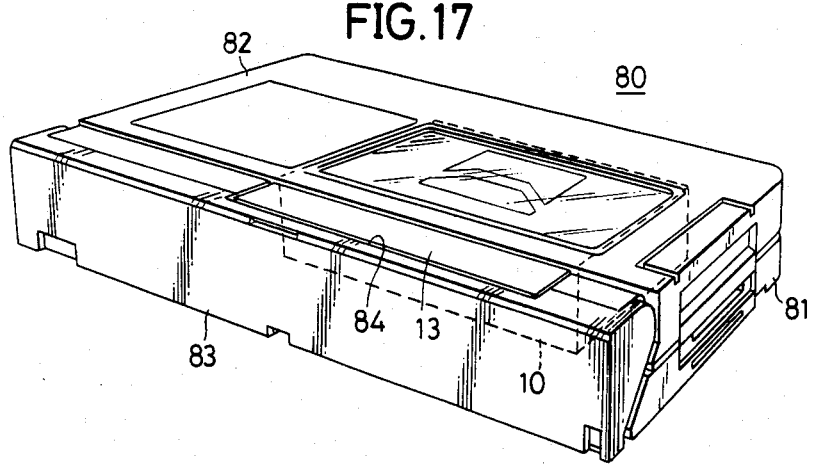

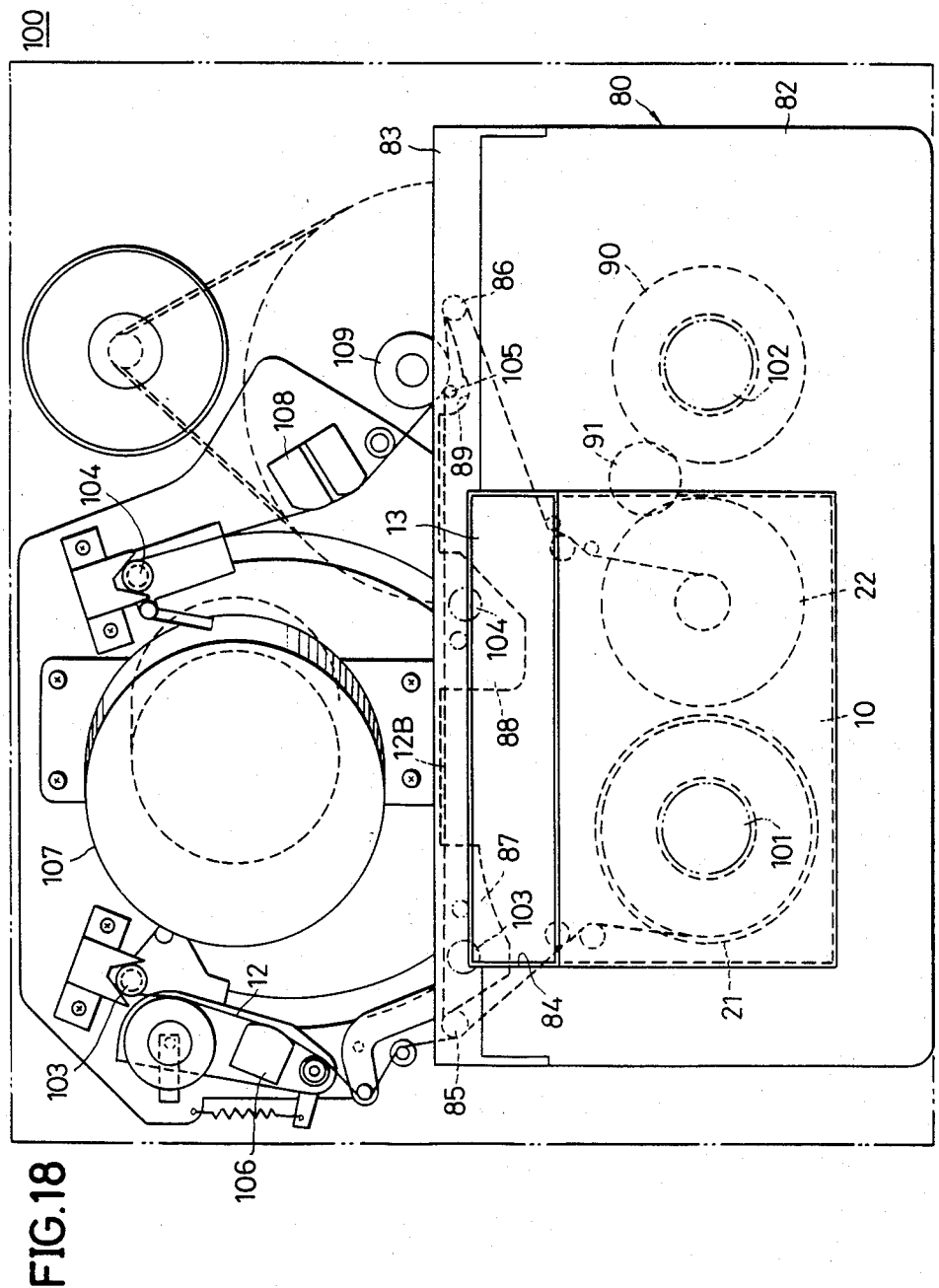

TAPE CASSETTE

BACKGROUND OF THE INVENTION

The present invention generally relates to tape cassettes, and more particularly to a tape cassette provided with a lid which closes to protect a tape extending along the front of a cassette case when the tape cassette is not used, and opens to a position not to interfere with the drawing of the tape out from the cassette case when the tape cassette is used, wherein the above lid is constructed to be maintained at the closed state and the open state.

Presently, video signal recording and/or reproducing apparatuses using tape cassettes are reduced to practical use on the world-wide basis. As types of these recording and/or reproducing apparatuses using tape cassettes, two or three standardized types of apparatuses presently exist world-widely. There is no interchangeability between apparatuses of different standards, however, the interchangeability exists between apparatuses adopting the same standard. Accordingly, a tape cassette recorded by one recording and/or reproducing apparatus can be reproduced by another recording and/or reproducing apparatus of the same standard. Hence, in order to ensure the interchangeability between different recording and/or reproducing apparatuses manufactured by different manufacturers so as to perform recording and/or reproduction, a standardization is established with respect to formats of the tape cassette and the recording and/or reproducing apparatus. That is, the above formats are standardized for each standard, and a standard type tape cassette and a standard type recording and/or reproducing apparatus are respectively manufactured and marketed.

Recently, a problem of much importance involves the realization in reducing the size of the recording and/or reproducing apparatus main body. This is to develop a more compact portable type recording and/or reproducing apparatus, and, for example, to realize such an equipment that a recording apparatus is unitarily built into a television camera.

In this regard, some attempts have been made to develop a compact type recording and/or reproducing apparatus using a compact or miniature type tape cassette, which uses a tape pattern and format completely different from those of the standard type recording and/or reproducing apparatus using the standard type tape cassette which are already and widely accepted in the market. However, such compact type recording and/or reproducing apparatus attempted for realization uses a format completely different from that of the standard type recording and/or reproducing apparatus, and the interchangeability does not exist therebetween. Therefore, in this compact type recording and/or reproducing apparatus, there is a disadvantage in that a tape cassette recorded by the compact type recording and/or reproducing apparatus cannot be reproduced by the standard type recording and/or reproducing apparatus. This is a great inconvenience and disadvantage to the owners of the compact type recording and/or reproducing apparatus.

Another attempt has also been made to realize a compact type portable recording and/or reproducing apparatus which performs recording and/or reproduction with the same tape pattern and format as the standard type recording and/or reproducing apparatus, by using a tape cassette whose size is slightly reduced by reducing the tape quantity and the diameter of the reels from those of the standard type tape cassette. In this system, a tape cassette recorded by the portable recording and/or reproducing apparatus can be reproduced as it is by the standard type recording and/or reproducing apparatus.

However, in the tape cassette used in the above portable recording and/or reproducing apparatus, the distance between a supply side reel and a take-up side reel is set equal to the distance between the supply side and take-up side reels of the standard type tape cassette, so that the tape cassette used for the portable recording and/or reproducing apparatus can be loaded into the standard type recording and/or reproducing apparatus. Hence, even when the tape quantity is reduced in order to reduce the diameter of the reels, there is a limit in reducing the diameter of these reels. Therefore, in this system, there was a disadvantage in that the size of the tape cassette as a whole could not be reduced significantly, and the same is true to the recording and/or reproducing apparatus.

Furthermore, another system is conceivable in which the tape quantity is reduced to reduce the diameter of the reels, and further, the miniature type tape cassette is constructed by reducing the distance between the supply side and take-up side reels. In this system, as a modification of the standard type recording and/or reproducing apparatus, the recording and/or reproducing apparatus can be constructed so that a reel disc for driving the take-up side reel is movable. In this modification of the standard type recording and/or reproducing apparatus, the take-up side reel disc is at a normal position when loaded with the standard type tape cassette, and the take-up side reel disc is moved to a position closer to the supply side reel disc when loaded with the miniature type tape cassette.

However, even in this system, for example, there is a disadvantage in that the miniature type tape cassette recorded by the compact type recording and/or reproducing apparatus cannot be reproduced by the standard type recording and/or reproducing apparatus which is presently in wide use. Moreover, there is a disadvantage in that it is extremely difficult to realize a mechanism for moving the reel disc in the manner described above. Furthermore, the recording and/or reproducing apparatus using the tape cassette generally has a mechanism for drawing out the tape from inside the tape cassette to load the tape onto a predetermined tape path within the recording and/or reproducing apparatus. Therefore, it is also exceedingly difficult to construct the above mechanism for pulling out the tape, so that interchangeability exists with respect to the above compact or miniature type tape cassette and the standard type tape cassette. Practically, the realization of such a mechanism is virtually impossible.

SUMMARY OF THE INVENTION

Accordingly, it is a general object of the present invention to provide a novel and useful tape cassette in which the above described disadvantages have been overcome.

Another and more specific object of the present invention is to provide a tape cassette provided with a lid which closes to protect a tape extending along the front surface side of a cassette case when the tape cassette is not used, and opens to a position not to interfere with the drawing of the tape out from the cassette case when the tape cassette is used, wherein the lid is constructed to be maintained at the closed state and the open state. According to the tape cassette of the present invention, since the lid is maintained at the open state once the lid is opened, when accommodating the tape cassette into a tape cassette adapter having an external form and size substantially equal to those of a standard type tape cassette prior to being used with respect to a standard type recording and/or reproducing apparatus which performs recording and/or reproduction when loaded with the standard type tape cassette, for example, there is no need to hold the lid in the open state by a finger. Hence, the tape cassette can easily be accommodated within the tape cassette adapter in a state where the lid is in the open state, and further, the tape can be drawn outside the cassette case with ease.

Still another object of the present invention is to provide a tape cassette provided with a mechanism capable of maintaining the above lid in the closed state and the open state by use of an extremely simple construction. Since the construction of the above mechanism is simple, the mechanism can easily be assembled at the side surface of a miniature type tape cassette.

Other objects and further features of the present invention will be apparent from the following detailed description when read in conjunction with the accompanying drawings.

BRIEF DESCRIPTION OF THE DRAWINGS

FIG. 10 is a view showing a cross section along a line X—X in FIG. 9;

FIG. 11 is a perspective view showing a leaf spring and a slide rod shown in FIG. 9 in relation;

FIGS. 12 and 13 are a plan view and a side view respectively showing an essential part of a third embodiment of a tape cassette according to the present invention;

FIG. 14 is a perspective view showing a slide rod shown in FIG. 13;

FIG. 17 is a perspective view showing an example of a tape cassette adapter in a state where the tape cassette shown in FIG. 1 is accommodated therein; and FIG. 18 is a plan view showing an example of a standard type recording and/or reproducing apparatus loaded with the tape cassette adapter shown in FIG. 17.

DETAILED DESCRIPTION

Figure 1:
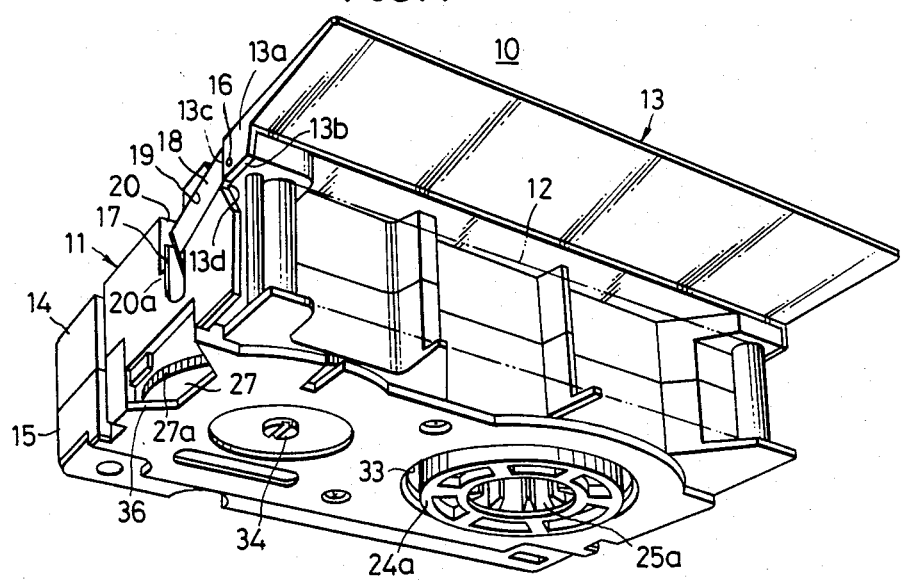
FIG. 1 is a perspective view showing a tape cassette according to the present invention in a state where a tape protecting lid is open, viewed from a lower direction with respect to the front surface of the tape cassette.

A miniature type tape cassette 10 according to the present invention has a configuration shown in FIGS. 1, 2A through 2D, 3, and 4. The tape cassette 10 has a cassette case 11 of a size smaller than a standard type tape cassette which is designed for a standard type recording and/or reproducing apparatus. A lid 13 for protecting a magnetic tape 12 accommodated within the tape cassette 10, is provided on the front of the cassette case 11. The cassette 11 consists of an upper half 14 and a lower half 15.

A part of a side surface flange part 13a which is unitarily formed on the lid 13 is axially supported by a hinge pin 16 at a part in the vicinity of a corner part of the upper half 14, so that the lid 13 is rotatable to open and close. A substantially U-shaped leaf spring 17 and a slide rod 18 which is urged in the direction toward the hinge pin 16 by the leaf spring 17, are provided in relation to the above lid 13. The lid 13 rotates about the hinge pin 16 and can assume two states. That is, in one state, the lid 13 is in a closed state shown in FIG. 2B, and in another state, the lid 13 is in an open state shown in FIG. 1. When the tape cassette 10 is not loaded into a recording and/or reproducing apparatus exclusively designed for the tape cassette 10 or accommodated within a tape cassette adapter (description with respect to the recording and/or reproducing apparatus exclusively designed for the tape cassette 10 and the tape cassette adapter will be given afterwards), the lid 13 covers the front of the cassette case 11 to protect the magnetic tape 12 which is exposed at the front surface of the cassette case 11.

Figure 3:
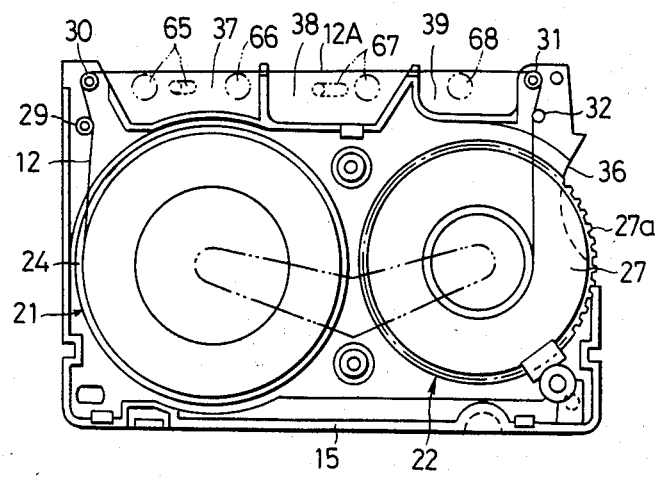
FIG. 3 is a plan view showing the inner construction of the tape cassette shown in FIG. 1 in a state where an upper half of a cassette case and an upper flange of a reel are removed.
Figure 4:
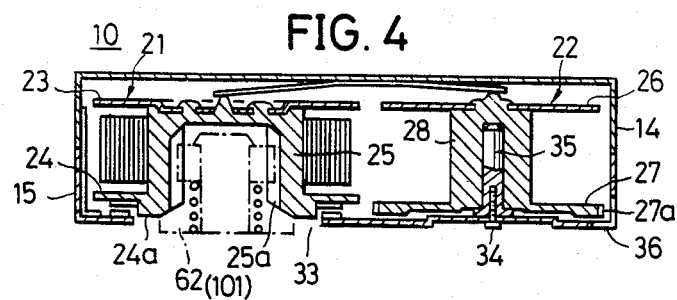
FIG. 4 is a view showing a cross section along a line IV—IV in FIG. 2A.

In addition, as shown in FIGS. 3 and 4, a supply side reel (supply reel) 21 and a take-up side reel (take-up reel) 22 are provided side by side within the cassette case 11. With respect to the supply reel 21, the magnetic tape 12 is wound around a reel hub 25 between upper and lower flanges 23 and 24. Similarly, the magnetic tape 12 is wound around a reel hub 28 between upper and lower flanges 26 and 27, with respect to the take-up reel 22. The magnetic tape 12 is unwound from the supply reel 21 and guided by guide poles 29, 30, 31, and 32 provided at left and right end sides, along the front surface side of the cassette case 11, to form a tape path 12A reaching the take-up reel 22.

The supply reel 21 is provided in a state where an annular projecting step portion 24a of the lower flange 24 is loosely fitted into a hole 33 having a large diameter on the lower half 15.

The take-up reel 22 is provided in a rotatable manner in such a way that a fixed shaft 35 embedded in the lower half 15 by a screw 34, is inserted into a center hole of the reel hub 28. A part of a gear 27a formed at the peripheral of the lower flange 27 of the take-up reel 22, is exposed through a cutout window 36 provided in the lower half 15.

Description will now be given with respect to a lid opening/closing structure which constitutes an essential part of the tape cassette according to the present invention, by referring to FIGS. 5A, 5B, 5C, 6 and 7.

The side flange part 13a of the lid 13 is of a rectangular shape, and has two side edges 13b and 13c with a corner part 13d formed therebetween. The slide rod 18 is provided within a guide groove 19 at the side of the upper half 14, in a freely slidable manner. As shown in FIG. 6, the slide rod 18 has a trapezoidal cross section, and the guide groove 19 is formed in the shape of a dovetail groove. Accordingly, the slide rod 18 is prevented from slipping out of the guide groove 19, and is maintained within the guide groove 19. As shown in FIGS. 5A through 5C, and 7, the guide groove 19 extends obliquely downward from the hinge pin 16. A tip end surface 18a of the slide rod 18 at the side of the lid 13 is formed perpendicular to the top surface of the cassette case 10 to meet the opposing face of the side flange part 13a. The above U-shaped leaf spring 17 is fitted within a side groove 20 in a state held by a projecting rib 20a, so that the U-shaped leaf spring 17 does not easily slip out from the side groove 20. A rear part 18b of the slide rod 18 which projects within the side groove 20 is pushed by the U-shaped leaf spring 17, and the slide rod 18 is accordingly urged in the direction of an arrow A1.

Figure 7:
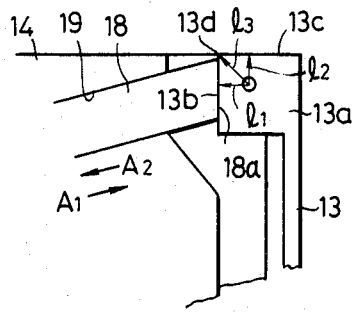
FIG. 7 is a view showing an axially supporting part of the lid shown in FIG. 5A in an enlarged scale.

When observing the positional relationship between the hinge pin 16, the corner part 13d of the side surface flange part 13a, and the side edges 13b and 13c, as shown in an enlarged scale in FIG. 7, relations l3>l1 and l3>l2 stand where l1 is the distance between the hinge pin 16 and the side edge 13b, l2 is the distance between the hinge pin 16 and the side edge 13c, and l3 is the distance between the hinge pin 16 and the corner part 13d.

Figure 2A:
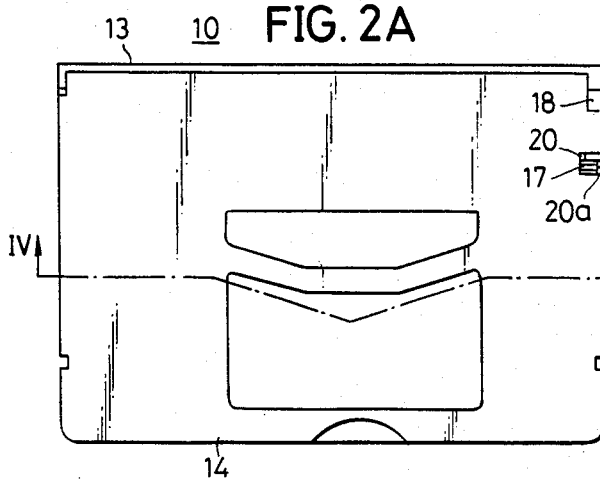
FIGS. 2A, 2B, 2C, and 2D are respectively a plan view, a side view, a bottom view, and a rear view of the tape cassette shown in FIG. 1.
Figure 2B:
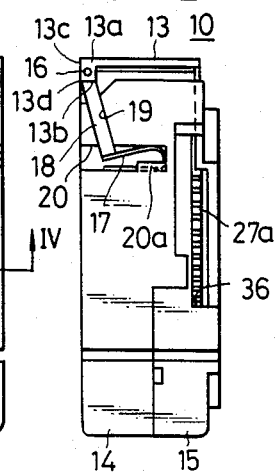
Figure 2D:
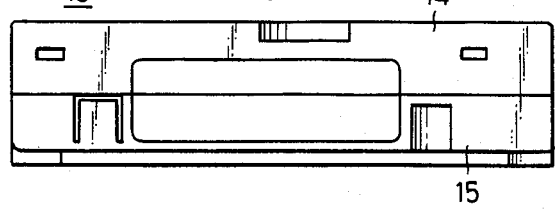
Figure 2C:
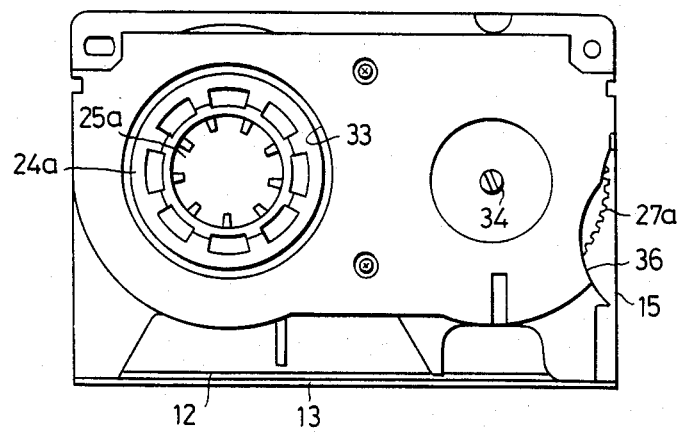
Figure 5A:
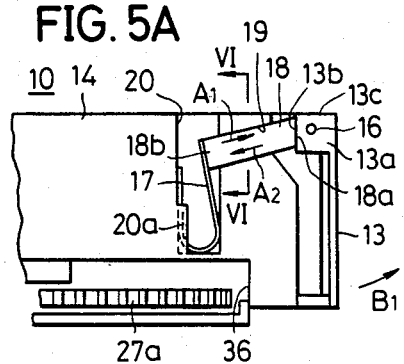
FIGS. 5A, 5B, and 5C are side views respectively showing a tape protecting lid of the tape cassette shown in FIG. 1 for exhibiting the lid in a closed state, an open state, and a state where the lid is held at a quasi-stable position.
Figure 6:
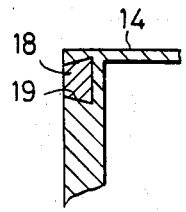
FIG. 6 is a view showing a cross section along a line VI—VI in FIG. 5A.

When the lid 13 is in the closed state, the end surface 18a of the slide rod 18 makes contact with and pushes the side edge 13b of the side surface flange 13a along a full length of the side edge 13b which extends to both the upper and lower sides of the hinge pin 16 as shown in FIGS. 2B, 5A, and 7. Accordingly, in order to rotate the lid to open, the slide rod 18 has to be depressed in the direction of an arrow A2 against a pressure of the leaf spring 17. Hence, the lid 13 is maintained at a vertical rotational position shown in FIGS. 2B, 5A, and 7, that is, at the closed position.

Figure 5B:
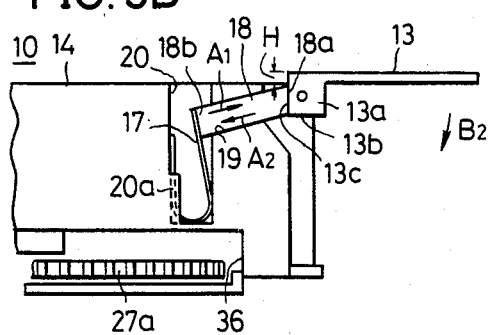

On the other hand, when the lid 13 is in the open state, the end surface 18a of the slide rod 18 makes contact with and pushes the side edge 13c of the side surface flange 13a along a full length of the side edge 13c which extends to both the upper and lower sides of the hinge pin 16, as shown in FIGS. 1 and 5B. Thus, the lid 13 is maintained at a horizontal position shown in FIGS. 1 and 5B, that is, at the open position. Since the lid 13 is maintained open by itself, a manipulation such as accommodating the tape cassette 10 within a tape cassette adapter and drawing the tape out from the tape cassette 10 which will be described hereinafter, can be performed without an effort of holding the lid 13 with a finger. At the open position, the lid 13 projects from the upper surface of the upper half 14 by a distance H.

Figure 5C:
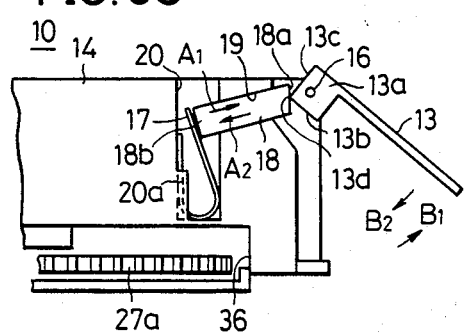
Figure 8:
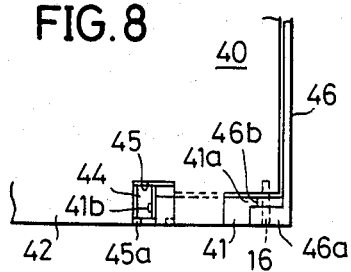
FIGS. 8 and 9 are a plan view and a side view respectively showing an essential part of a second embodiment of a tape cassette according to the present invention.
Figure 9:
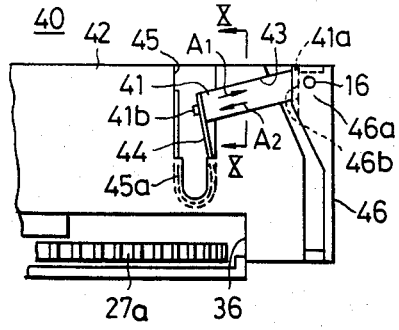

In addition, when performing the lid opening/closing operation with respect to the lid 13, the lid 13 rotates so that the corner part 13d of the side flange 13a pushes the slide rod 18 away in the direction of the arrow A2 against the force exerted by the spring 17, as shown in FIG. 5C. When the corner part 13d exceeds the position of the hinge pin 16 along the direction of its height to reach a position above or below the hinge pin 16, the rotational force which had been applied to rotate the lid 13 acts on the lid 13 to push the slide rod 18. Therefore, the lid 13 is rotated to the closed position shown in FIG. 5A or the open position shown in FIG. 5B, and maintained at that position. That is, when opening the lid 13 from the state shown in FIG. 5A by rotating the lid 13 towards the direction of an arrow B1, the lid 13 is urged towards the lid opening direction when passing beyond an intermediate point (quasi-stable point) of rotation shown in FIG. 5C, and the lid 13 is opened completely even when the operator's finger is released. On the other hand, when closing the lid 13 from the state shown in FIG. 5B by rotating the lid 13 towards the direction of an arrow B2, the lid 13 is urged towards the lid closing direction when passing beyond the intermediate point of rotation shown in FIG. 5C, and the lid 13 is positively closed even when the operator's finger is released.

Furthermore, even when the lid 13 is partly rotated towards the lid opening direction or the lid closing direction, the lid 13 automatically returns to the original closed position or the open position when the operator's hand is released, unless the lid 13 is rotated to a position beyond the intermediate point of rotation shown in FIG. 5C. Accordingly, even when the lid 13 is slightly rotated towards the lid opening direction upon handling of the tape cassette 10, the lid 13 is immediately returned to the original closed position. This is a desirable feature in view of protecting the tape. Moreover, during the operation in which the tape cassette 10 is accommodated within the tape cassette adapter, the lid 13 immediately returns to the original open position when the open lid 13 is erroneously pushed by a small force, and no inconveniences are introduced.

An essential part of a second embodiment of a tape cassette according to the present invention is shown in FIGS. 8 through 11. In each of the FIGS. 8 through 11, those parts which are the same as those corresponding parts in FIG. 1 are designated by the same reference numerals.

In a tape cassette 40, a slide rod 41 has a rectangular cross section as shown in FIG. 10. This slide rod 41 is fitted into a guide groove 43 having a rectangular cross section, provided in an upper half 42. Since the cross section of this guide groove 43 is of a rectangular shape, the moulding of the groove 43 is simpler compared to the case of the above described guide groove 19 having the shape of a dovetail groove. This is an advantageous feature for moulding the upper half 42. However, in the state as it is, the slide rod 41 will easily slip out from the guide groove 43. Accordingly, measures are taken to respectively hold both end sides of the slide rod 41 so that the slide rod 41 does not slip out from the guide groove 43. That is, one end side of the slide rod 41 is formed as an L-shape having a projecting rib part 41a at the side towards the inner part, and a projecting part 41b is formed at the other end side of the slide rod 41, as shown in FIG. 11. A U-shaped leaf spring 44 has a hole 44a for receiving the above projection 41b, at a part in the vicinity of the tip end of one arm part of this U-shaped leaf spring 44. The U-shaped leaf spring 44 is fitted into a groove 45 of the upper half 42 in a state where the U-shaped leaf spring 44 is held by a projecting rib 45a. In addition, a depressed step part 46b for receiving the above projecting rib part 41a, is formed at the inner side of a side flange part 46a of a lid 46.

With respect to the side of the flange part 46a of the slide rod 41, the projecting rib part 41a fits between the flange part 46a and the side surface of the upper half 42. Moreover, with respect to the side of the U-shaped leaf spring 44, the projection 41b fits within the hole 44a. Hence, the slide rod 41 is held within the guide groove 43 in a freely slidable manner, so that the slide rod 41 does not slip out from the guide groove 43.

An essential part of a third embodiment of a tape cassette according to the present invention is shown in FIGS. 12 through 14. In each of the FIGS. 12 through 14, those parts which are the same as those corresponding parts in FIG. 1 and FIGS. 8 through 10 are designated by the same reference numerals.

In a tape cassette 50, a slide rod 51 has a rectangular cross section. Similarly as in the case of the slide rod 41 shown in FIG. 10, the slide rod 51 is fitted into the guide groove 43 having a rectangular cross section. As shown in FIG. 14, a projecting rib part 51a is formed at the center of one end surface of the slide rod 51, and a projection 51b is formed on the other end surface of the slide rod 51. The projecting rib part 51a of the slide rod 51 fits within a groove part 52b provided in a flange part 52a of a lid 52. In addition, the projection 51b of the slide rod 51 is fitted within the hole 44a of the leaf spring 44. Accordingly, the slide rod 51 is held within the guide groove 43 in a freely slidable manner, so that the slide rod 51 does not slip out from the guide groove 43.

The actions of the slide rods 41 and 51 with respect to the lids 46 and 52 of the above tape cassettes 40 and 50, respectively, are similar to those of the above described tape cassette 10. Therefore, the lids 46 and 52 are respectively maintained in the closed position or the open position.

Figure 15:
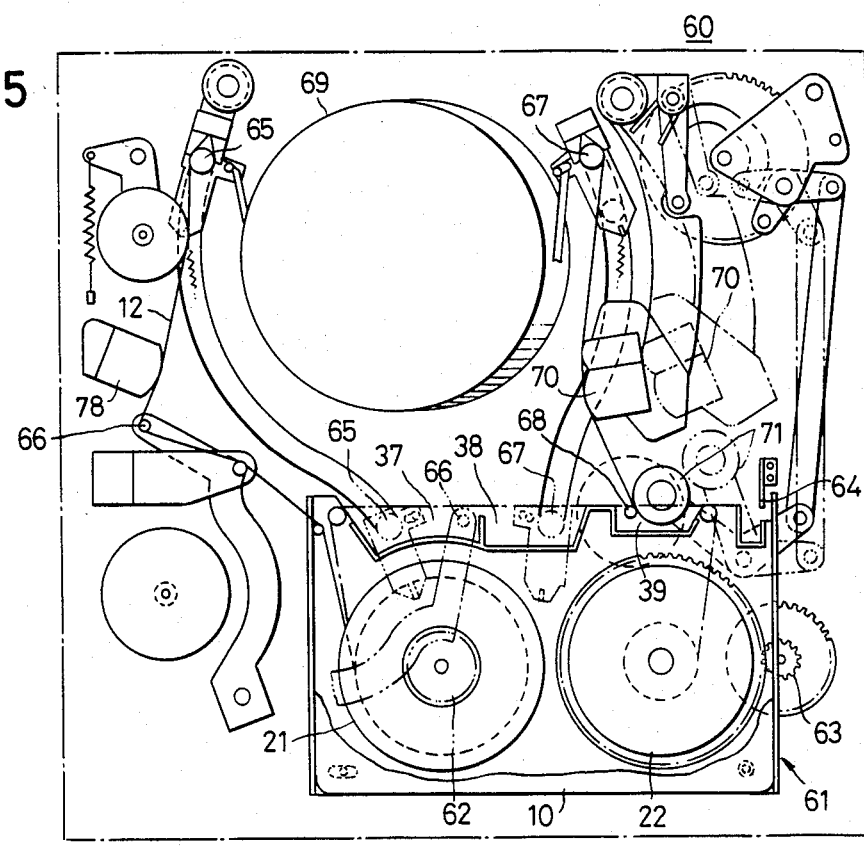
FIG. 15 is a plan view showing an example of a compact type recording and/or reproducing apparatus into which the tape cassette shown in FIG. 1 is loaded.
Figure 16:
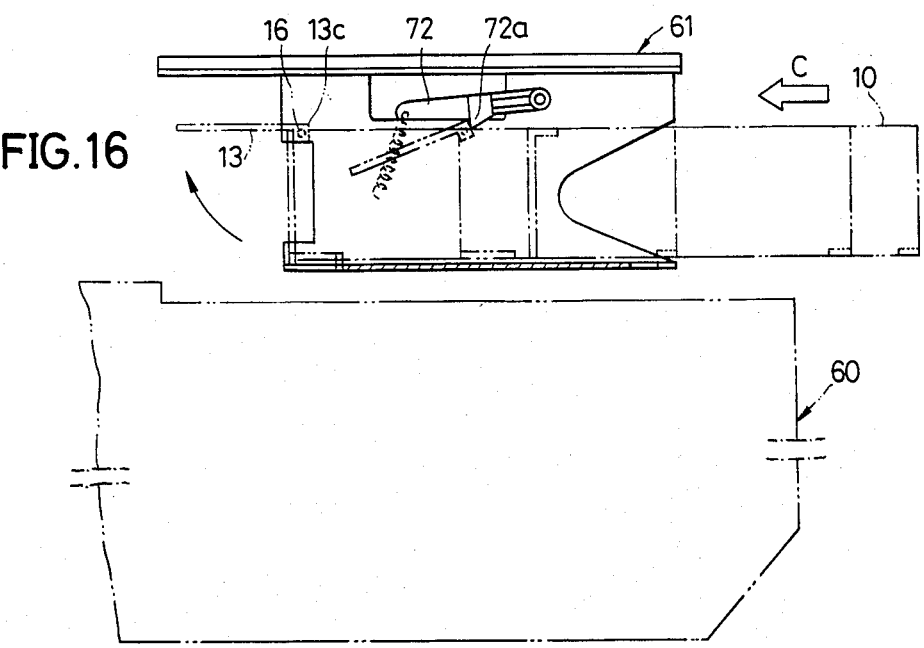
FIG. 16 is a side view showing a tape cassette housing of the apparatus shown in FIG. 15.

Each of the above tape cassettes 10, 40, and 50 are loaded independently into a compact type recording and/or reproducing apparatus, as shown in FIGS. 15 and 16, and used.

These tape cassettes 10, 40, and 50 are first accommodated within the tape cassette adapter, and loaded into the standard type recording and/or reproducing apparatus as shown in FIGS. 17 and 18, and used.

FIG. 15 shows a compact type recording and/or reproducing apparatus 60. As shown in FIG. 16, the tape cassette 10 is inserted, in the direction of an arrow C from the side of the lid 13, into a predetermined position within a cassette housing 61 having a pop-up mechanism, by inserting the tape cassette 10. Thereafter, the tape cassette 10 is lowered together with the cassette housing 61, and is loaded into a loading part. Hence, a supply reel driving shaft 62 fits into the supply reel 21, and the gear 27a formed at the peripheral part of the lower flange 27 of the take-up reel 22 meshes with a driving gear 63.

In relation to the above loading operation of the tape cassette 10, the lid 13 makes contact with a lid opening projection provided in the apparatus and is accordingly relatively opened. Once the lid 13 is opened, the lid 13 is maintained at the open position due to the action of the leaf spring 17 and the slide rod 18. Further, a loading pole 65 and a tension pole 66 relatively enter within a cutout 37, while a loading pole 67 and a capstan 68 respectively and relatively enter into cutouts 38 and 39.

When the operational mode of the recording and/or reproducing apparatus 60 is set to a play mode, the above poles 65, 66, and 67 intercept and engage with the magnetic tape 12 to draw out the magnetic tape 12, and respectively move to positions indicated by solid lines in FIG. 15. Hence, the magnetic tape 12 is drawn out of the tape cassette 10, to make contact with a full-width erasing head 78. The magnetic tape 12 further makes contact with a guide drum 69 provided with rotary video heads over a predetermined angular range, and also makes contact with an audio and control head 70. Thus, the magnetic tape 12 is loaded onto a predetermined tape travelling path. During recording and reproduction, the magnetic tape 12 is driven in a state pinched between the capstan 68 and a pinch roller 71. Moreover, the gear 63 which is rotated by a reel driving motor (not shown) meshes with the gear 27a of the take-up reel 22, and the take-up reel 22 is accordingly driven towards a tape take-up direction. A signal is recorded onto the magnetic tape 12 with a tape pattern and format identical to those of the standard type recording and/or reproducing apparatus.

When an eject button (not shown) is pushed, the cassette housing 61 rises, and the tape cassette 10 is pushed out by the cassette housing 61 due to the action of a spring (not shown). In a case where the tape cassette 10 is pushed out towards the right in FIG. 16, a part of the side edge 13c of the side surface flange part 13a of the lid 13 which is in an open state, which projects from the upper surface of the tape cassette 10, hits a pushing part 72a of a pushing lever 72. Hence, the lid 13 is applied with a force acting towards a lid closing direction, and the lid 13 closes against the force exerted by the U-shaped leaf spring 17. Thus, the tape cassette 10 is retrieved from the cassette housing 61 in a state where the lid 13 is closed.

FIG. 17 shows a tape cassette adapter 80 in a state where the tape cassette 10 is accommodated therein. The tape cassette adapter 80 has an external form and size identical to those of the standard type tape cassette, and consists of a lower half 81, an upper half 82, and an opening and closing lid 83. The tape cassette 10 is accommodated within the tape cassette adapter 80 in a state where the lid 13 is open, and the lid 13 which is maintained at the open state fits within an opening 84. Moreover, as shown in FIG. 18, the tape cassette 10 is accommodated within the tape cassette adapter 80 with the magnetic tape 12 drawn out of the tape cassette 10 and threaded around guide poles 85 and 86, so that the magnetic tape 12 is guided by the guide poles 85 and 86 for transport. Since the lid 13 is maintained open as described above, there is no need to hold the lid 13 open when performing the above tape threading operation, and the tape threading operation can be performed with ease. The magnetic tape 12 forms a tape path 12B traversing the front of cutouts 87, 88, and 89, similarly as in the case of the standard type tape cassette In addition, the take-up reel 22 of the tape cassette 10 links to an intermediate gear 91 which is in mesh with a gear structure 90.

As shown in FIG. 18, the tape cassette adapter 80 accommodating the tape cassette 10 is loaded into a standard type recording and/or reproducing apparatus 100, similarly as in the case where the standard type tape cassette is loaded.

That is, by loading the tape cassette adapter 80, a supply reel driving shaft 101 is inserted into the reel driving shaft inserting part 25a of the supply reel 21 of the tape cassette 10. On the other hand, a take-up reel driving shaft 102 is inserted into a reel driving shaft inserting part of the gear structure 90 within the tape cassette adapter 80. In addition, loading poles 103 and 104 and a capstan 105 respectively enter into the cutouts 87, 88, and 89.

Upon a tape loading operation, the above loading poles 103 and 104 respectively intercept and engage with the magnetic tape 12, then draw the magnetic tape 12 out of the tape cassette as the loading poles 103 and 104 move away from the cutouts 87 and 88, and reach positions indicated by solid lines in FIG. 18. Accordingly, the magnetic tape 12 which is drawn outside the tape cassette adapter 80, makes contact with a full-width erasing head 106, and makes contact with a guide drum 107 provided with rotary video heads over a predetermined angular range The magnetic tape 12 further makes contact with an audio control head 108. Therefore, the above magnetic tape 12 is loaded onto a predetermined tape travelling path.

During recording and reproduction, the magnetic tape 12 is driven in a state pinched between the capstan 105 and a pinch roller 109. Moreover, the gear structure 90 within the tape cassette adapter 80 is rotated in the clockwise direction by the take-up reel driving shaft 102. This rotation of the gear structure 90 is transmitted to the take-up reel 22 through the intermediate gear 91, to drive the magnetic tape 12 towards a tape take-up direction. Accordingly, the magnetic tape 12 fed out by the capstan 105 is taken-up by the take-up reel 22.

Furthermore, the tape cassette 10 can be accommodated within and used with respect to a tape cassette adapter which is constructed to form a magnetic tape path identical to that formed within the standard type tape cassette, by just operating a lever and without touching the magnetic tape. The lid 13 of the tape cassette 10 is maintained open, and the magnetic tape 12 is drawn out by the poles without being interfered by the lid 13. Accordingly, the operation to draw the magnetic tape 12 out from the tape cassette within the tape cassette adapter, can be performed smoothly.

The lid opening and closing mechanism which constitutes the essential part of the present invention is not limited to the lid of the embodiment of the miniature type tape cassette described above. The lid opening and closing mechanism can similiarly be applied to the lid of the standard type tape cassette, and further to the lid of the tape cassette adapter shown in FIG. 17.

Moreover, the lid opening and closing mechanism is only provided on one side of the tape cassette in the above embodiments of the invention, however, the lid opening and closing mechanism can be provided on both sides of the tape cassette, if needed.

Further, the present invention is not limited to these embodiments, but various variations and modifications may be made without departing from the scope of the present invention.

What is claimed is:

1. A tape cassette comprising:
   a cassette case having top and bottom surfaces;
   a tape accommodated within said cassete case, said tape having a front tape path part extending along the front surface of said cassette case when said tape cassette is not used;
   a lid pivotally supported to rotate around a pair of stationary pivots in a vicinity of a corner part of said cassette case, said lid being rotatable between an open state and a closed state, in said open state said lid being positioned approximately in a plane including the top surface or the bottom surface of the cassette case, in said closed state said lid covering the tape at said front tape path part; and
   positioning means for urging said lid to move in a lid opening direction when said lid is opened to a rotational position exceeding an intermediate point of rotation and for urging said lid to move in a lid closing direction when said lid is closed to a rotational position exceeding the intermediate point of the rotation, so that said lid is maintained in the open state and the closed state, respectively.

2. A tape cassette comprising:
   a cassette case having top and bottom surfaces;
   a tape accommodated within said cassette case, said tape having a front tape path part extending along the front surface of said cassette case when said tape cassette is not used;
   a lid pivotally supported to rotate around a pair of stationary pivots in a vicinity of a corner part of said cassette case, said lid being rotatable between an open state and a closed state, in said open state said lid being positioned approximately in a plane including the top surface or the bottom surface of the cassette case, in said closed state said lid covering the tape at said front tape path part; and
   positioning means for urging said lid to move in a lid opening direction when said lid is opened to a rotational position exceeding an intermediate point of rotation and for urging said lid to move in a lid closing direction when said lid is closed to a rotational position exceeding the intermediate point of the rotation, so that said lid is maintained in the open state, respectively, said positioning means comprising a slide rod making contact with a peripheral surface of said lid in a vicinity of a rotary fulcrum of said lid; urging means for urging said slide rod in a direction which makes contact with said peripheral surface of said lid, and said peripheral surface in the vicinity of said fulcrum is shaped so that a distance between an end of said slide rod facing said peripheral surface and said fulcrum is a minimum when said lid is in the open or closed state and said distance is greater than the minimum when said lid assumes a rotational position other than the open and closed states.

3. A tape cassette as claimed in claim 2 in which said positioning means further has a first groove in a side surface of said cassette case, said first groove being fitted to receive said slide rod in a freely slidable manner, and a second groove in a side surface of said cassette case, for acommodating said urging means, said urging means being located at a rear part of said slide rod.

4. A tape cassette as claimed in claim 3 in which said urging means consists of a U-shaped leaf spring accommodated within said second groove, and one arm of said U-shaped leaf spring makes contact with the rear end of said slide rod.

5. A tape cassette as claimed in claim 2 in which parts of said lid making contact with said slide rod are unitarily formed on one side of said lid.

* * * * *

UNITED STATES PATENT AND TRADEMARK OFFICE
CERTIFICATE OF CORRECTION

PATENT NO. : 4,494,161

DATED : January 15, 1985

INVENTOR(S) : HARUKA OGATA, ET AL.

It is certified that error appears in the above-identified patent and that said Letters Patent is hereby corrected as shown below:

Claim 1, Column 10, line 33, between "open state" and the " , " (the comma), insert --and the closed state--.

*Signed and Sealed this*

*Thirteenth* Day of *August 1985*

[SEAL]

*Attest:*

DONALD J. QUIGG

*Attesting Officer*     *Acting Commissioner of Patents and Trademarks*